United States Patent
Krishnaswamy

(10) Patent No.: US 6,735,774 B1
(45) Date of Patent: May 11, 2004

(54) METHOD AND APPARATUS FOR SYSTEM CALL MANAGEMENT

(75) Inventor: Umesh Krishnaswamy, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 09/694,746

(22) Filed: Oct. 23, 2000

(51) Int. Cl.⁷ .............................. G06F 9/00; G06F 9/46
(52) U.S. Cl. ........................................... 719/328; 711/1
(58) Field of Search ..................... 709/328; 719/328; 711/1

(56) References Cited

U.S. PATENT DOCUMENTS

| | | | | |
|---|---|---|---|---|
| 5,566,334 A | * | 10/1996 | Loader | 709/100 |
| 5,790,860 A | * | 8/1998 | Wetmore et al. | 717/122 |
| 6,026,235 A | * | 2/2000 | Shaughnessy | 717/127 |
| 6,112,253 A | * | 8/2000 | Gerard et al. | 709/315 |
| 6,202,208 B1 | * | 3/2001 | Holiday, Jr. | 717/166 |
| 6,529,985 B1 | * | 3/2003 | Deianov et al. | 710/260 |
| 6,546,553 B1 | * | 4/2003 | Hunt | 717/174 |

* cited by examiner

*Primary Examiner*—Meng-Al T. An
*Assistant Examiner*—Diem Cao

(57) ABSTRACT

Method and apparatus for managing operating system calls. In a computer system that includes a system vector and a first vector table, an alternative vector table is provided. The first vector table includes references to respective segments of operating system program code that are associated with operating system calls, and the alternative vector table includes references to one or more respective segments of wrapper program code associated with segments of operating, system program code. The system vector is set to reference the first vector table or the alternative vector table at selected times during execution of a user program. Thus, segments of operating system code are executed in response to operating system calls made when the system vector references the first vector table, and segments of code referenced in the alternative vector table are executed when the system vector references the alternative vector table.

19 Claims, 4 Drawing Sheets

METHOD AND APPARATUS FOR SYSTEM CALL MANAGEMENT

FIELD OF THE INVENTION

The present invention generally relates to program calls to system routines, and more particularly to profiling system calls.

BACKGROUND

Operating systems generally include routines for providing to application programs services such as forking a new process or allocating memory. While virtually indispensable for the functions provided by the application, system calls may create challenges for the other tools used by a program developer.

For example, programmers will sometimes use tools for debugging, instrumentation, etc. These tools generally provide an environment in which the program executes. The Object Code Translator (OCT) from Hewlett Packard Company, for example, provides a variety of functions such as translation of object code from one processor architecture to another, code optimization, and instrumentation of operating system calls.

One challenge for a tool such as OCT is that while the system call may produce the desired result from the standpoint of the application, the system call may produce undesired side-effects from the standpoint of the tool. For example, the UNIX system call, exec( ), may be called to overlay a new program. To avoid being overwritten with the new program, the tool must intercept the call so that it can be included in the overlay. The tool must therefore be programmed to take appropriate measures when these system calls are made.

Some tools intercept system calls by retaining continuous control of the application and trapping system calls. For example, each branch instruction is tested for whether it references a system call. This continuous monitoring introduces a large overhead in running the application in conjunction with the tool.

A method and apparatus that address the aforementioned problems, as well as other related problems, are therefore desirable.

SUMMARY OF THE INVENTION

In various embodiments, a method and apparatus are provided for managing operating system calls. In a computer system that includes a system vector and a first vector table, an alternative vector table is provided. The first vector table includes references to respective segments of operating system program code that are associated with operating system calls, and the alternative vector table includes references to one or more respective segments of wrapper program code associated with segments of operating system program code. The system vector is set to reference the first vector table or the alternative vector table at selected times during execution of a user program. Thus, segments of operating system code are executed in response to operating system calls made when the system vector references the first vector table, and segments of code referenced in the alternative vector table are executed when the system vector references the alternative vector table. By using an alternative vector table, the overhead normally associated with intercepting system calls is reduced.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
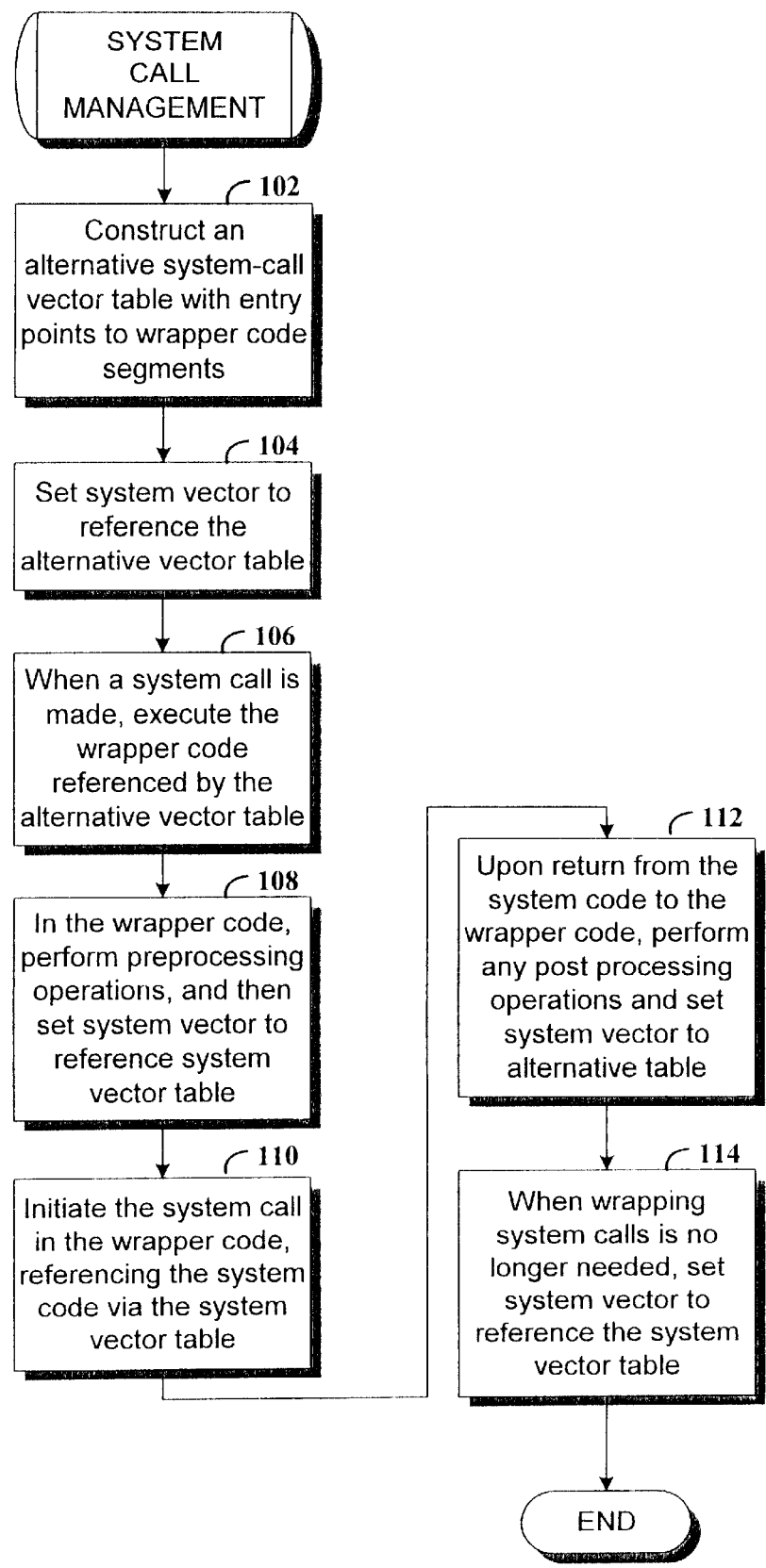
FIG. 1 is a flowchart of a process for system call management in accordance with one embodiment of the invention.

Various embodiments of the present invention are described in terms of the UNIX operating system and the Object Code Translator software from Hewlett Packard. Those skilled in the art will appreciate that the embodiments described herein could be adapted for use with other operating systems and other tools.

Some systems that make system calls available to application programs do so through a vector table. The operating system kernel sets up the system call vector table with pointers to kernel entry points of the individual system calls. The table is readable by any user process. At the time of process creation, the kernel loader puts the starting address of the vector table in a system vector that is passed to the program.

In accordance with one embodiment of the invention, an alternative vector table is created and used to redirect system calls. The system vector is manipulated to activate either the system vector table or the alternative vector table. The alternative vector table includes references to entry points of segments of program code that are associated with the system calls. When a system call is made and the system vector is set to reference the alternative vector table, the entry point in the alternative vector table that is associated with the system call is used instead of the entry point specified in the system vector table. The overhead associated intercepting system calls is greatly reduced by automatically redirecting the system calls rather than monitoring every instruction to check for certain branch instructions.

The particular program code associated with the entry points in the alternative vector table will vary in accordance with the associated system call and the functions provided by the tool implemented by the code. For example, when the exit( ) system call is made, the tool may be profiling the application and need to dump counter values and relinquish various resources to the operating system before the actual operating system code is executed.

Table 1 below illustrates some example UNIX system calls and associated example preprocessing and post processing.

TABLE 1

| System call | Special processing |
| --- | --- |
| fork( ) vfork( ) | Before a fork, pending asynchronous signals of the parent process may need to be cleared. |

TABLE 1-continued

| System call | Special processing |
|---|---|
| exec*( ) | The parameters passed to exec( ) may need to be modified in order to attach the OCT to the new process ("*" denotes references to specific system calls). |
| munmap( ) | Check whether the referenced memory contains wrapper code or data |
| brk( ) | brk( ) calls that extend the data region must be translated to mmap( ) calls since a dynamic OCT may load an application by memory mapping text and data regions. |
| exit( ) | Counters need to be dumped and resources relinquished. |
| close( ) dup( ) | OCT needs to check whether the application is attempting to close a file descriptor that is used by OCT. |
| sig*( ) | Signal-related system calls need to have their arguments modified and have certain housekeeping performed. |
| lightweight system calls | Lightweight versions of the above-referenced system calls have wrapper processing as described above. |
| user-specified system calls | A user may desire to profile, trace, or instrument system calls for analysis purposes. |

FIG. 1 is a flowchart of a process for system call management in accordance with one embodiment of the invention. The process generally entails constructing an alternative vector table and manipulating the system vector at selected times to reference either the system vector table or the alternative vector table.

At step 102, the alternative system-call vector table is constructed. Each entry in the vector table corresponds to an entry in the system vector table. Depending on the particular tool making use of the alternative vector table, some entries in the alternative table may point to tool program code, and other entries in the alternative table may point to the system code. That is, the tool may not need to perform any preprocessing or post processing for some system calls. Thus, the tool introduces essentially no overhead when system calls are made that the tool does not need to intercept.

The tool program code that is referenced in the alternative wrapper table is referred to herein as "wrapper code." The tool code wraps the code of the system call in the sense that certain operations are performed prior to invoking the system code and certain operations are performed after invoking the system code. It will be appreciated that for some tools and/or system calls no preprocessing operations may be required, while for other tools and/or system calls no post processing operations may be required.

In an example operating system in which the present invention can be used, library stub routines are associated with the system calls. For example, the HP-UX operating system from Hewlett Packard has library stub routines associated with the available system calls. When a system call is made, the library stub routine is entered for that system call. The stub routine uses a system call number to index into the system-vector table in order to retrieve the operating system entry point for the system call. At step 104, the system vector is set to reference the alternative vector table. Thereafter, library stub routines reference the alternative vector table instead of the system-call vector table, as shown by step 106.

At step 108, the wrapper code referenced by the alternative vector table is executed. Any preprocessing to be performed before initiating the actual system call is performed at step 108. For example, the wrapper routine may update a histogram associated with the system call and/or log the system call and the states of parameters passed to the system call. The log information may be stored to a file, for example. After the preprocessing is complete, the system vector is set to reference the system-call vector table.

At step 110, the system call is made again from within the wrapper code. Since the system vector has been set to reference the system-call vector table, the library stub routine will transfer control to the operating system entry point referenced in the system-call vector table.

At step 112, the value of the system vector is changed back to reference the alternative vector table when control returns from the system code. In addition, any post processing operations are performed. For example, the wrapper code may log the state of parameters after the system call exits and record the state of an error code.

When wrapping the system calls is no longer required, the value of the system vector is set to reference the system-call vector table, as shown at step 114.

Figure 2:
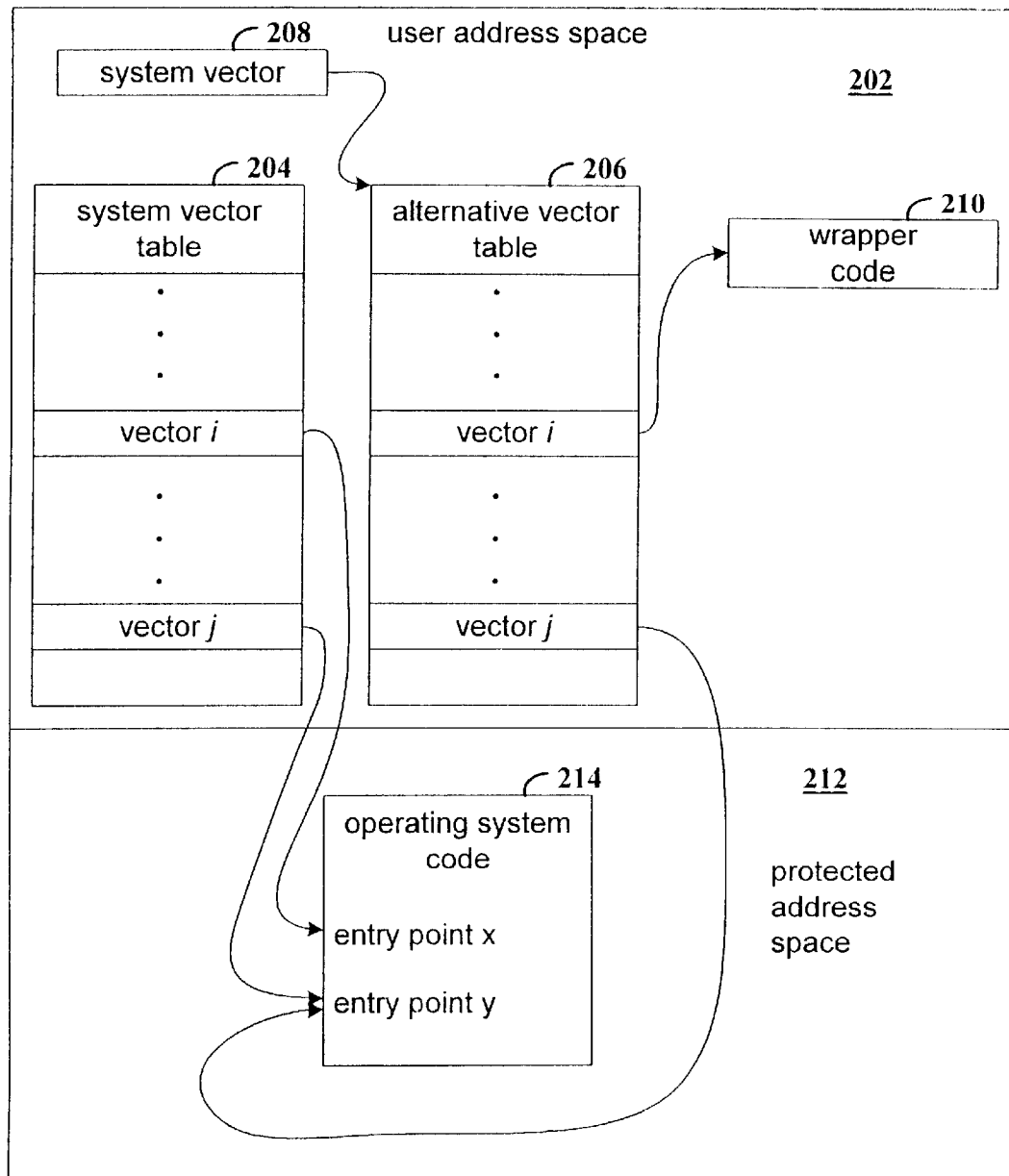
FIG. 2 is a block diagram that illustrates the relationships between a system vector table, an alternative vector table, wrapper code, and system code in accordance with one embodiment of the invention.

FIG. 2 is a block diagram that illustrates the relationships between the system vector table, alternative vector table, wrapper code, and system code in accordance with one embodiment of the invention. User address space 202 includes system vector table 204, alternative vector table 206, system vector 208, and wrapper code 210. Protected address space 212 includes the operating system code 214.

The operating system kernel, for example HP-UX, sets up system vector table 204 having pointers to entry points of operating system code 214. For example, vector i references entry point X. The system vector table is readable by any user process and both readable and writable by the operating system. At the time of process creation, the loader component of the operating system puts the starting address of system vector table 204 in system vector 208.

To intercept system calls without negatively impacting to a substantial degree, a tool (e.g., OCT) creates alternative vector table 206. Alternative vector table 206 includes entries that correspond to the entries in system vector table 204. For example, alternative vector table 206 includes vector i that corresponds to vector i of system vector table 204. However, vector i in alternative vector table 206 references wrapper code 210. The tool can select which of tables 204 and 206 that system vector 208 references at selected times.

When system vector 208 references alternative vector table 206 and a system call is made having entry point X, for example, the library stub routine associated with the system call will branch first to wrapper code 210. The particular operations performed by the wrapper code are dependent on the application and the particular system call. To execute the actual code that implements the system call, system vector 208 must be changed to point to system vector table 204. Thus, under control of wrapper code 210 or code that supports the analysis tool, the system vector is changed to reference system vector table 204, and the system call is made again. Since the system vector now points to system vector table 204, entry point X is used to begin execution of the system call.

In an alternative embodiment, instead of changing system vector 208 prior to making the system call from the wrapper code, the wrapper code reads the corresponding entry from system vector table 204 and then jumps to the referenced entry point. One advantage to this approach is that it avoids interference between threads when referencing system vector 208. In the other embodiment (where the system vector is changed), changing system vector 208 for the brief interval when executing actual system call may cause other threads to reference the system vector table 204 rather than the alternative vector table 206.

When execution of the code for the system call is complete, control is returned to wrapper code 210. If the tool is to continue intercepting system calls, system vector 208 is changed to reference alternative vector table 206. Thereafter, the library stub routines for the system calls branch to the wrapper code referenced in the alternative vector table.

It will be appreciated that not all of the system calls need have associated wrapper code. The entries in the alternative vector table can be made to reference wrapper code for those system calls for which additional processing is desired ("special system calls"), or reference the same entry points as are present in the system vector table for other system calls ("non-special system calls"). For example, vector j in both system vector table 204 and alternative vector table 206 reference entry point y. Adding and removing wrapper code associated with system calls can be accomplished by changing entries in the alternative vector table, for example with an interactive tool.

Figure 3:
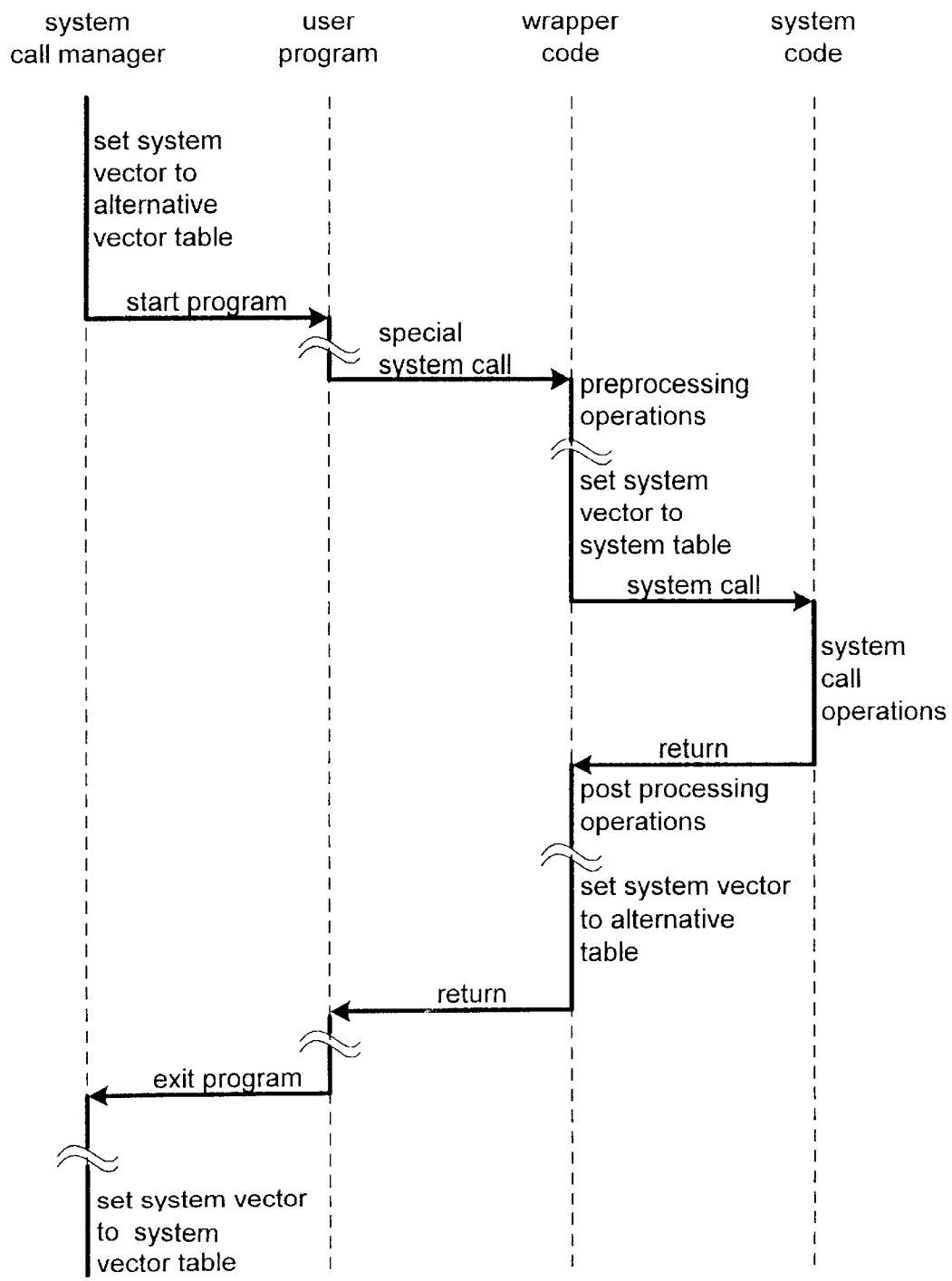
FIG. 3 is a control flow diagram that illustrates the flow of control for a special system call between system call manager software, a user application, wrapper code, and system code in conjunction with use of the alternative vector table.

FIG. 3 is a control flow diagram that illustrates the flow of control between system call manager software, a user application, wrapper code, and system code in conjunction with use of the alternative vector table. The vertical lines mark the control flow within each of the associated software elements, with specific operations set forth in text beside the vertical lines. The horizontal lines represent transfer of control from one software element to another, and the associated text describes the event causing the transfer.

Under control of the system manager software, the system vector is set to reference the alternative vector table. Control is transferred to the user program when the program is started, and execution of the user program proceeds to where a "special" system call is made. "Special" refers to those system calls that have associated wrapper code to perform some additional processing. "Non-special" system calls are those for which there is no additional processing to be performed (FIG. 4).

When a special system call is made, control is transferred to the associated wrapper code via the alternative vector table. The wrapper code performs any programmed preprocessing operations prior to making the actual system call. Just before making the system call, the wrapper code (or alternatively, some other code that supports the system call manager) sets the system vector to reference the system vector table. Then when the system call is made, control is transferred to the system program code where the system call operations are performed. The system code returns control to the wrapper code, which then performs any post processing operations (relative to the system call operations).

The wrapper code sets the system vector to reference the alternative vector table prior to returning control to the user program. The sequence for making special system calls can then be repeated for the remainder of the user program. When the user program is complete, or when the user wishes to discontinue system call profiling, or when the system call manager is detached from the user program, control is passed to the system call manager, and the system vector is set to reference the system vector table at a time prior to exiting the system call manager.

Figure 4:
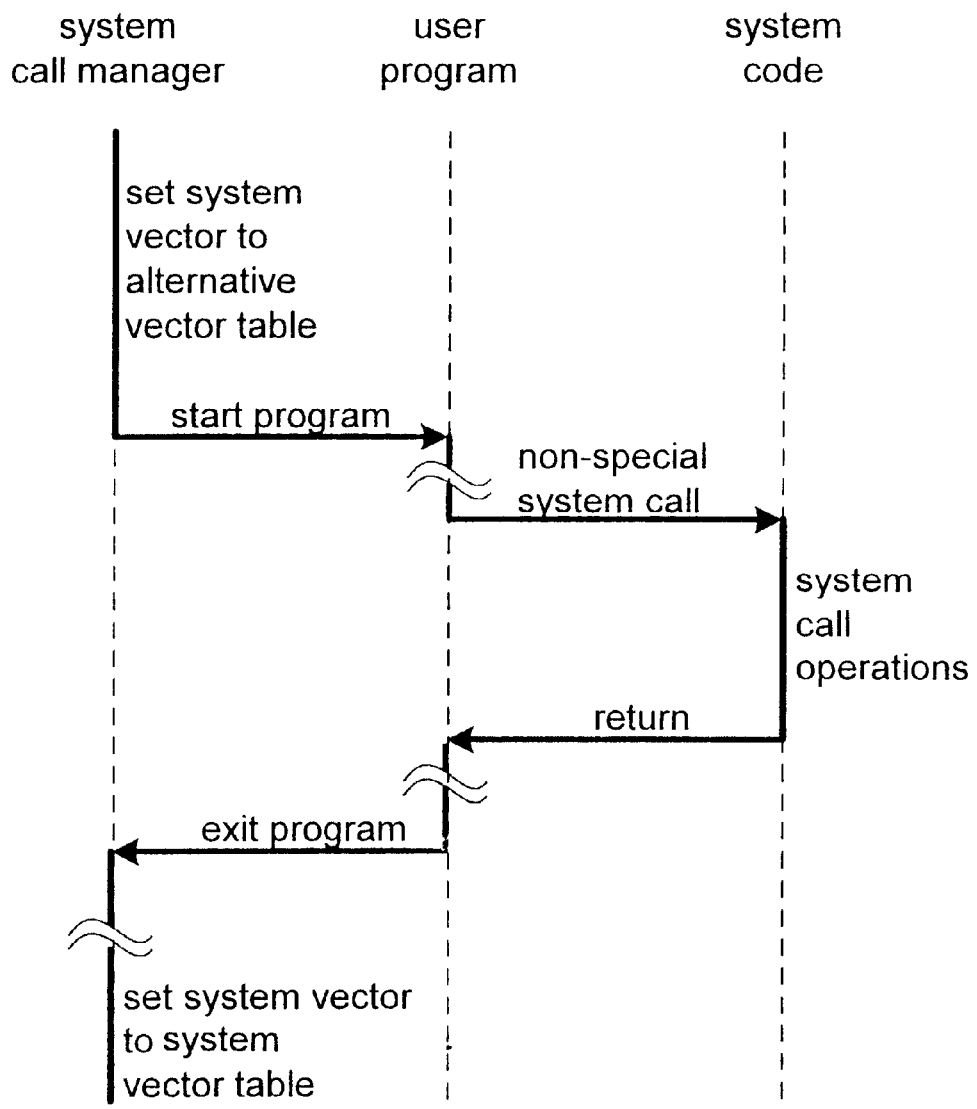
FIG. 4 is a control flow diagram that illustrates the flow of control for a non-special system call between a system call manager software, a user application, and system code in conjunction with use of the alternative vector table.

FIG. 4 is a control flow diagram that illustrates the flow of control between system call manager software, a user application, and system code in conjunction with use of the alternative vector table. FIG. 4 illustrates an example in which a non-special system call is made by the user program, as compared to FIG. 3 where a special system call was made.

As in FIG. 3, system call manager software in FIG. 4 sets the system vector to reference the alternative vector table. When the user program makes a non-special system call, control is passed to the system code. For example in FIG. 3, reference to vector j in alternative vector table 206 via system vector 208, results in transfer of control to entry point y of operating system code 214. For non-special system calls, there is no need to set the system vector to reference the system vector table since no wrapper code is executed and control is transferred directly to the system code.

When the system code is complete, control is returned to the user program. When the user program exits, the system call manager sets the system vector to reference the system vector table at some time prior to completion.

The present invention is believed to be applicable to a variety of tools for analyzing system call characteristics in the context of an application program. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for managing operating system calls during execution of a first computer program in a computer system, the computer system including a system vector and a first vector table, the first vector table including references to respective segments of operating system program code associated with operating system calls, the method comprising:

establishing a second vector table, the second vector table including references to one or more respective segments of wrapper program code associated with segments of operating system program code; and setting the system vector to reference the first vector table or the second vector table at selected times during execution of the first program, whereby segments of operating system code are executed in response to operating system calls made when the system vector references the first vector table, and segments of code referenced in the second vector table are executed when the system vector references the second vector table.

2. The method of claim 1, further comprising:

setting the system vector to reference the first vector table upon execution of wrapper program code; and setting the system vector to reference the second vector table upon completing execution of operating system code.

3. The method of claim 2, further comprising:

setting a first set of entries in the second vector table to reference respective segments of wrapper code; and setting a second set of entries in the second vector table to reference respective segments of operating system code.

4. The method of claim 1, further comprising:

executing a segment of wrapper code associated with a first selected entry in the second vector table in response to a first system call;

reading a second selected entry from the first vector table that corresponds to the first selected entry of the second vector table while the system vector is set to reference the second vector table; and executing a segment of operating system code referenced by the second selected entry from the first vector table.

5. The method of claim 1, further comprising:

setting a first set of entries in the second vector table to reference respective segments of wrapper code; and setting a second set of entries in the second vector table to reference respective segments of operating system code.

6. The method of claim 1, further comprising updating in execution of the segments of wrapper code a histogram of system call invocations.

7. The method of claim 1, further comprising logging in execution of the segments of wrapper code system call invocations.

8. The method of claim 7, further comprising logging in execution of the segments of wrapper code states of parameters provided in system call invocations.

9. The method of claim 7, further comprising logging in execution of the segments of wrapper code states of error codes returned from system call invocations.

10. A method for managing operating system calls during execution of a first computer program in a computer system, the computer system including a system vector and a first vector table, the vector table including references to respective segments of operating system program code, the method comprising:

establishing an alternative vector table, the alternative vector table including references to one or more respective segments of wrapper program code associated with segments of operating system program code;

selectively associating a reference to the alternative vector table with the system vector at a first selected time during execution of the first program;

executing segments of wrapper program code via references in the second vector table in response to operating system calls when the system vector is associated with the reference to alternative vector table;

associating a reference to the first vector table with the system vector at a second selected time during execution of the segments of wrapper program code; and executing segments of operating system code via references in the first vector table when the system vector is associated with the reference to first vector table.

11. The method of claim 10, further comprising:

setting a first set of entries in the alternative vector table to reference respective segments of wrapper code; and setting a second set of entries in the alternative vector table to reference respective segments of operating system code.

12. The method of claim 10, further comprising updating in execution of the segments of wrapper code a histogram of system call invocations.

13. The method of claim 10, further comprising logging in execution of the segments of wrapper code system call invocations.

14. The method of claim 13, further comprising logging in execution of the segments of wrapper code states of parameters provided in system call invocations.

15. The method of claim 13, further comprising logging in execution of the segments of wrapper code states of error codes returned from system call invocations.

16. An apparatus for managing operating system calls during execution of a first computer program, comprising:

a first vector table arranged in a computer memory and including a plurality of addresses referencing respective segments of operating system program code;

a second vector table arranged in a computer memory and including one or more addresses referencing one or more respective segments of wrapper program code associated with the segments of operating system program code, respectively;

a system vector arranged for storage of an address that references either of the first or second vector tables;

a system call manager coupled to the first and second vector tables and to the system vector, the system call manager configured and arranged to selectively set the value of the system vector to the addresses of the first and second vector tables at selected times.

17. The apparatus of claim 16, wherein the second vector table further comprises a first set of entries that reference respective segments of wrapper code and a second set of entries that reference respective segments of operating system code.

18. An apparatus for managing operating system calls during execution of a first computer program in a computer system, the computer system including a system vector and a first vector table, the first vector table including references to respective segments of operating system program code associated with operating system calls, the apparatus comprising:

means for establishing a second vector table, the second vector table including references to one or more respective segments of wrapper program code associated with segments of operating system program code; and means for setting the system vector to reference the first vector table or the second vector table at selected times during execution of the first program, whereby segments of operating system code are executed in response to operating system calls made when the system vector references the first vector table, and segments of code referenced in the second vector table are executed when the system vector references the second vector table.

19. The apparatus of claim 18, wherein the second vector table further comprises a first set of entries that reference respective segments of wrapper code and a second set of entries that reference respective segments of operating system code.

* * * * *